United States Patent
Almeida et al.

(10) Patent No.: US 10,771,367 B1
(45) Date of Patent: Sep. 8, 2020

(54) CUSTOMER PREMISES EQUIPMENT CENTRALIZED SELF-TEST AND SYSTEM CHECK

(71) Applicant: CSC HOLDINGS, LLC, Bethpage, NY (US)

(72) Inventors: Heitor J. Almeida, Elmsford, NY (US); John Markowski, Smithtown, NY (US)

(73) Assignee: CSC Holdings, LLC, Bethpage, NY (US)

( * ) Notice: Subject to any disclaimer, the term of this patent is extended or adjusted under 35 U.S.C. 154(b) by 73 days.

(21) Appl. No.: 16/036,475

(22) Filed: Jul. 16, 2018

(51) Int. Cl.
*H04L 12/26* (2006.01)
*H04L 12/28* (2006.01)
*H04L 12/24* (2006.01)

(52) U.S. Cl.
CPC .......... *H04L 43/10* (2013.01); *H04L 12/2861* (2013.01); *H04L 12/2898* (2013.01); *H04L 41/0677* (2013.01); *H04L 41/509* (2013.01); *H04L 43/0817* (2013.01)

(58) Field of Classification Search
CPC combination set(s) only.
See application file for complete search history.

(56) References Cited

U.S. PATENT DOCUMENTS

| | | | |
|---|---|---|---|
| 2015/0117397 A1* | 4/2015 | Ofir | H04L 65/1046 370/331 |
| 2015/0379518 A1* | 12/2015 | May | G06Q 20/08 705/44 |
| 2017/0068550 A1* | 3/2017 | Zeitlin | G06F 9/4843 |

* cited by examiner

*Primary Examiner* — El Hadji M Sall
(74) *Attorney, Agent, or Firm* — Sterne, Kessler, Goldstein & Fox P.L.L.C.

(57) ABSTRACT

The present disclosure describes a service provider system within a point-to-multipoint communication system that commandeers unused or under-utilized subscriber devices within the point-to-multipoint communication system to perform various tasks within the point-to-multipoint communication system. By harnessing these otherwise unused or under-utilized subscriber devices, the service provider system identifies, locates, and/or resolves problems, gathers data/analytics, and/or performs system maintenance in a real-world environment, as opposed to a beta, testing, or staging environment. Thus, the service provider system can be used to analyze, investigate, and scrutinize actual experiences of subscribers to the service across disparate geographical regions, settings, and testing scenarios.

20 Claims, 3 Drawing Sheets

CUSTOMER PREMISES EQUIPMENT CENTRALIZED SELF-TEST AND SYSTEM CHECK

BACKGROUND

Service providers provide services to subscriber devices. The content of these services can include video, audio, and/or data, such as movies, television shows, news, and/or sports programming to provide some examples. At times, subscriber devices can experiences problems receiving the service.

BRIEF DESCRIPTION OF THE DRAWINGS/FIGURES

The present disclosure is described with reference to the accompanying drawings. In the drawings, like reference numbers indicate identical or functionally similar elements. Additionally, the left most digit(s) of a reference number identifies the drawing in which the reference number first appears. In the accompanying drawings.

The present disclosure will now be described with reference to the accompanying drawings.

DETAILED DESCRIPTION OF THE DISCLOSURE

Overview

The present disclosure describes a service provider system within a point-to-multipoint communication system that commandeers unused or under-utilized subscriber devices within the point-to-multipoint communication system to perform various tasks. These various tasks can include identifying, locating, and/or resolving various problems, gathering data/analytics, and/or performing system maintenance within the point-to-multipoint communication system. In some situations, the unused or under-utilized subscriber devices within the point-to-multipoint communication system can perform these tasks within geographical areas. The service provider system can remotely harness capabilities of these unused or under-utilized subscriber devices and aggregate results from completed tasks. By harnessing these otherwise unused or under-utilized subscriber devices, the service provider system identifies, locates, and/or resolves various problems, gathers data, and/or performs system maintenance in a real-world environment, as opposed to a beta, testing, or staging environment. Thus, the service provider system can analyze, investigate, and scrutinize actual experiences of subscribers across disparate geographical regions, settings, and testing scenarios.

Exemplary Point-to-Multipoint Communication System

Figure 1:
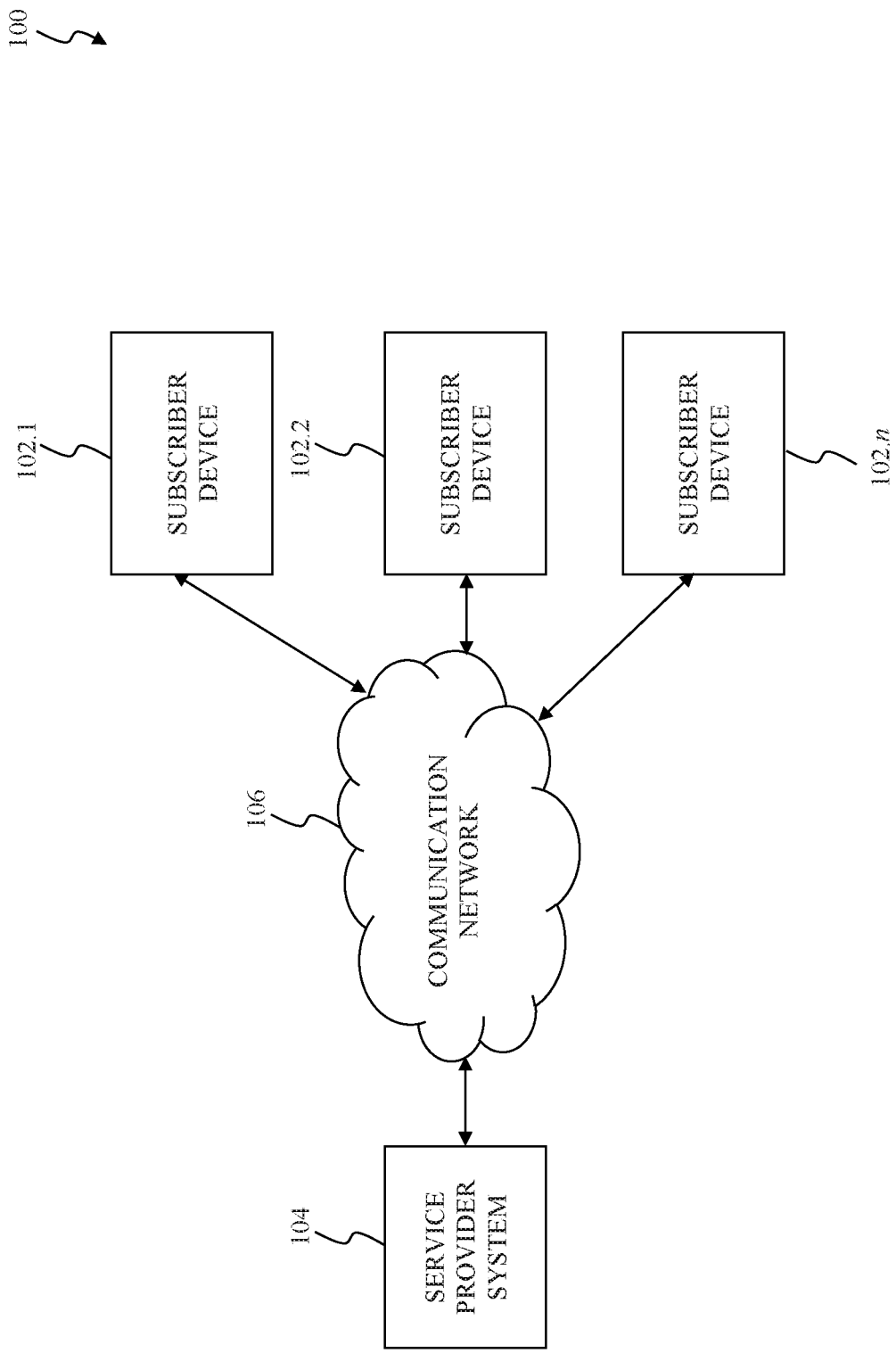
FIG. 1 illustrates a block diagram of an exemplary point-to-multipoint communication system, according to an embodiment of the present disclosure.

FIG. 1 illustrates a block diagram of an exemplary point-to-multipoint communication system according to an embodiment of the present disclosure. Point-to-multipoint communication system 100 includes subscriber devices 102.1 through 102.n, service provider system 104, and communication network 106.

Subscriber devices 102.1 through 102.n represent one or more personal computers, data terminal equipment, one or more telephony devices, such as one or more mobile phones or one or more mobile computing devices to provide some examples, one or more broadband media players, one or more network-controlled appliances, one or more set-top boxes, one or more wireless routers, and/or other devices capable of transmitting and/or receiving video, audio, and/or data that will be apparent to those skilled in the relevant art(s) without departing from the spirit and scope of the present disclosure. Subscriber devices 102.1 through 102.n can be capable of receiving tasks, e.g., instructions, object code, byte code, machine code, containers, binaries, virtual machines, etc., and executing, running, or otherwise completing the tasks.

Service provider system 104 can provide services to subscriber devices 102.1 through 102.n. In an embodiment, content of these services can include video, audio, and/or data, such as movies, television shows, news, and/or sports programming to provide some examples. At times, service provider system 104 can experience problems providing services to subscriber devices 102.1 through 102.n and/or subscriber devices 102.1 through 102.n can experience problems receiving services from service provider system 104. In some situations, problems can be experienced by service provider system 104, one of subscriber devices 102.1 through 102.n, and/or more than one of subscriber devices 102.1 through 102.n. For example, problems can be experienced by more than one of subscriber devices 102.1 through 102.n within a specific geographic location and/or across particular regions or areas. For further example, service provider system 104 can experience problems providing the services across the range of features (programs, subjects, etc.) or at certain times. As another example, disruptions in the communication network 106, which is to be described in further detail below, can cause problems. For example, a communication link within communication network 106 can be damaged, such as disconnected or cut, causing these problems. As to be discussed in further detail below, service provider system 104 can commandeer unused or under-utilized subscriber devices from among subscriber devices 102.1 through 102.n to remotely identify, locate, and/or resolve these problems.

Service provider system 104 determines which subscriber devices from among subscriber devices 102.1 through 102.n are unused or under-utilized subscriber devices. Herein, unused subscriber devices refers to subscriber devices from among subscriber devices 102.1 through 102.n which are not presently receiving the service from service provider system 104. These unused subscriber devices can be characterized as being in a low-power or standby modes of operation. Under-utilized subscriber devices refers to subscriber devices from among the subscriber devices 102.1 through 102.n which are presently receiving the service from service provider system 104 but have sufficient remaining capabilities available to perform additional tasks without impacting or interrupting the service. For example, in one embodiment, subscriber devices from among the subscriber devices 102.1 through 102.n which are simply displaying live television broadcasting can be considered under-utilized subscriber devices.

In an embodiment, service provider system 104 can poll subscriber devices 102.1 through 102.n for their current utilizations to identify unused or under-utilized subscriber devices from among subscriber devices 102.1 through 102.n. For example, service provider system 104 can poll subscriber devices 102.1 through 102.n for their current processor and/or memory utilizations to identify unused or the under-utilized subscriber devices from among subscriber devices 102.1 through 102.n. In this example, those subscriber devices from among subscriber devices 102.1 through 102.n having their current processor and/or memory utilizations less than a first threshold can be identified as the unused subscriber devices, and those subscriber devices from among subscriber devices 102.1 through 102.n having their current processor and/or memory utilizations between the first threshold and a second first threshold can be identified as the under-utilized subscriber devices. In an embodiment, service provider system 104 can determine which subscriber devices from among subscriber devices 102.1 through 102.n are unused or under-utilized subscriber devices in a specific geographic area. In this embodiment, the specific geographic area can correspond to one or more postal zip codes and/or one or more specific geographic areas within a map, to provide some examples.

In another embodiment, service provider system 104 can compile, manage, and maintain an index of unused or under-utilized subscriber devices from among subscriber devices 102.1 through 102.n. In this embodiment, the index can include subscriber devices from among subscriber devices 102.1 through 102.n which are available for commandeering. This index can be organized by geographic area to allow service provider system 104 to identify unused or under-utilized subscriber devices within a specific geographic area. Service provider system 104 can add, remove, and otherwise update the index as the statuses of subscriber devices 102.1 through 102.n change over time. For example, service provider system 104 can receive status change indicators, e.g., changes in subscriber devices 102.1 through 102.n from unused to used or from under-utilized to fully-utilized. One skilled in the art(s) will understand that as subscriber devices come in and out of use, service provider system 104 can update the index, i.e., the list of available subscriber devices can be dynamic over time. In one exemplary embodiment, service provider system 104 can provide an graphical interface that provides a mechanism to identify devices that are not currently in use.

In an embodiment, service provider system 104 can determine appropriate tasks to send to subscriber devices 102.1 through 102.n. The tasks can comprise scripts, containers, executables, applications, modules and/or other forms of instructions to execute or run on an unused or under-utilized subscriber device among subscriber devices 102.1 through 102.n. One skilled in the arts will understand that the breadth of available tasks that service provider system 104 can select from is broad and extensive. Just for example, performable functions can include: system checks, network viability checks, customer service-related checks, response time analyses, functional testing, regression or behavioral testing, etc. In an embodiment, service provider system 104 can provide a graphical interface facilitating task selection.

In an embodiment, service provider system 104 can schedule tasks for completion at a particular time and/or date. In another embodiment, service provider system 104 can schedule tasks to be recurring, i.e., daily, weekly, monthly, etc. In this embodiment, tasks' performances can be subject to the continued inactivity or under-utilization. In an alternate embodiment, service provider system 104 can schedule tasks to run immediately, i.e., at the present time.

In an embodiment, service provider system 104 can secure transmissions using any cryptographic protocol that enables secure communications. In one embodiment, service provider system 104 can use secure sockets layer (SSL) or transport layer security (TLS) to encrypt transmissions. Following task completion, service provider system 104 can receive output or results of the executed code via a similarly secured channel.

In an embodiment, service provider system 104 can receive results of completed tasks from the selected subscriber devices and further analyze, organize, and display the results. In one example, service provider system 104 can organize, aggregate, and/or display information received from the subscriber devices. In another example, service provider system 104 can receive and aggregate data to determine an average or other function across the chosen set of subscriber devices. Thus, service provider system 104 can analyze, investigate, and scrutinize the actual experience of subscribers across disparate geographical regions, settings, and testing scenarios.

In one example, and solely for illustrative purposes, new functionality could be rolled out to subscriber devices 102.1 through 102.n. This exemplary new functionality could require access to a new database table in service provider system 104. In this example, service provider system 104 could determine a subset of unused or under-utilized subscriber devices 102.1 through 102.n and then transmit tasks to the determined subset. The tasks could test whether the selected devices can access the new database table and read the data therein. In this example, service provider system 104 could limit the subset of unused or under-utilized subscriber devices 102.1 through 102.n across geographic regions and aggregate the data into displayable, reportable, or alternate format. Service provider system 104 could then analyze, return, display, further process, or otherwise use the results. For example, service provider system 104 could parse the data to report subscriber devices or geographic regions unable to access the new database table. Service provider system 104 could further receive read times to the new database table, perform statistical analyses on the received read times, and derive conclusions based upon the statistical analyses.

In another embodiment, and solely for the purposes of illustration, one specific subscriber device in subscriber devices 102.1 through 102.n can experience a particular problem at a particular time. During a subsequent service call to an administrator, basic checks of the specific subscriber device can be required, e.g., network connectivity, power availability, etc. Instead of asking the subscriber to intervene to perform these basic system checks, service provider system 104 can automatically send appropriate tasks to the specific subscriber device to test basic system capabilities. Service provider system 104 can analyze the results to determine root causes, provide further guidance, and/or display the results of these diagnostic tests. One skilled in the art(s) will appreciate that the capability of service provider system 104 to commandeer subscriber devices 102.1 through 102.n facilitates a multitude of test cases and real-world scenarios that would otherwise not be duplicable in a testing, beta, or staging environment.

Communication network 106 communicatively couples service provider system 104 and subscriber devices 102.1 through 102.n. Communication network 106 can be implemented as a wireless communication network, a wired communication network, and/or any combination thereof as will be apparent to those skilled in the relevant art(s) without departing from the spirit and scope of the present disclosure.

For example, communication network 106 can include one or more radio networks, such as terrestrial radio frequency networks or satellite radio frequency networks, one or more coaxial cable networks, one or more fiber optic cable networks, and/or another suitable communication network.

Exemplary Subscriber Device in the Point-to-Multipoint Communication System

Figure 2:
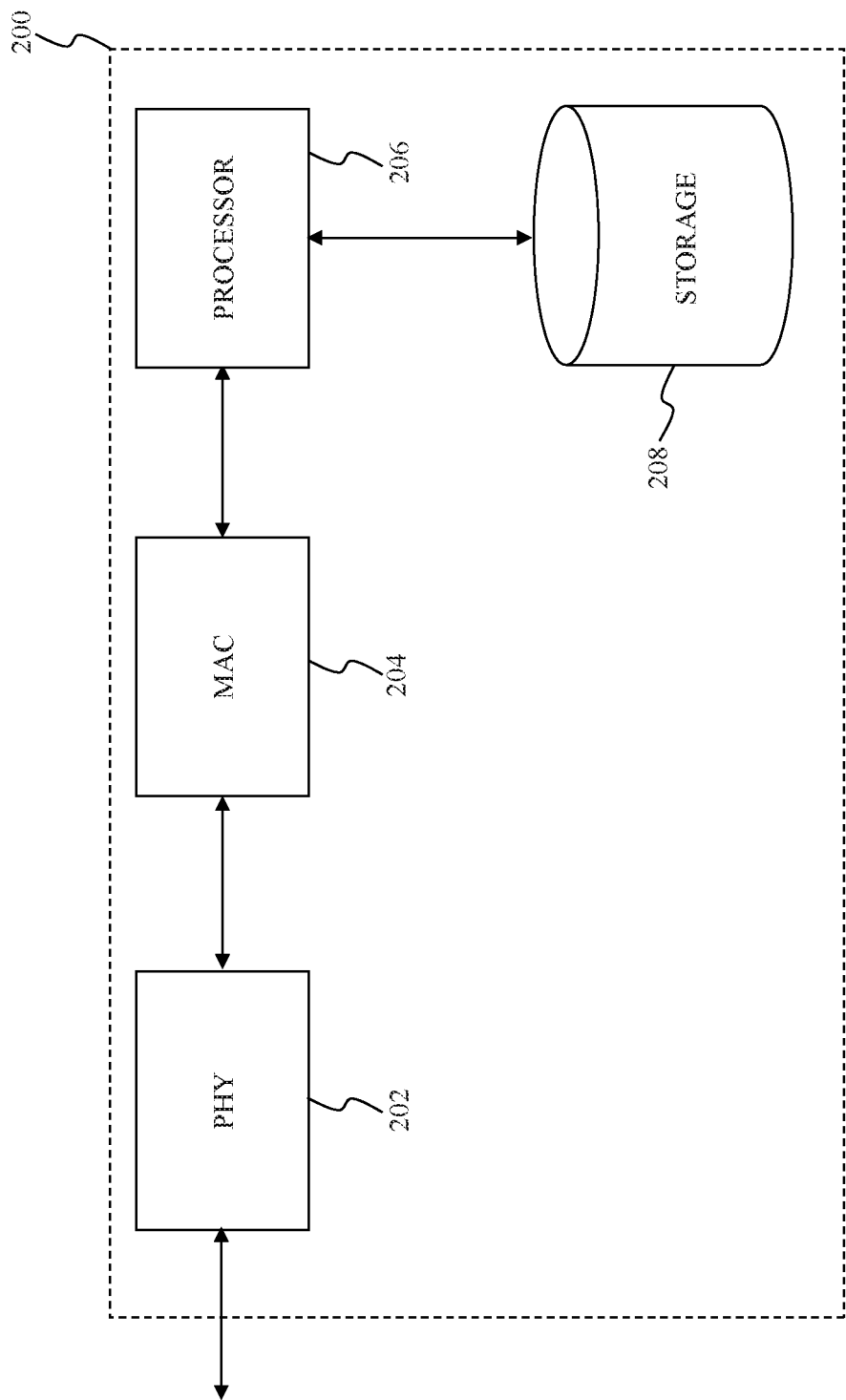
FIG. 2 illustrates a block diagram of a subscriber device, according to an embodiment of the present disclosure.

FIG. 2 illustrates a block diagram of an exemplary subscriber device 200 in exemplary point-to-multipoint communication system 100 according to an embodiment of the present disclosure. Subscriber device 200 can be utilized when unused or under-utilized to run a task or tasks. As illustrated in FIG. 2, subscriber device 200 includes PHY circuitry 202, media access controller (MAC) circuitry 204, processor circuitry 206, and storage medium 208. Subscriber device 200 can represent an exemplary embodiment of subscriber devices 102.1 through 102.$n$. In one embodiment, subscriber device 200 can experience technical difficulties, service lapses, connectivity issues, or other problems. Tasks can be sent to subscriber device 200 by service provider system 104 to diagnose the causes of these problems as described above in the discussion of FIG. 1 and further below.

PHY circuitry 202 represents an interface between a communication network, such as communication network 106 to provide an example, and MAC circuitry 204. Generally, PHY circuitry 202 can modulate, encode, and/or convert an information frame to provide an information signal for transmission to the communication network. PHY circuitry 202 can also demodulate, decode, and/or convert an information signal received over a communication network to provide an information frame.

MAC circuitry 204 represents an interface between PHY circuitry 202 and processor circuitry 206. MAC circuitry 204 can manage and maintain communication by coordinating access to the communication network and formatting communication in accordance with one or more communication standards or protocols. MAC circuitry 204 can also de-encapsulate or de-frame in accordance with the one or more communication standards or protocols.

Processor circuitry 206 controls the overall operation and/or configuration of subscriber device 200. For example, processor circuitry 206 can receive tasks as executables, binaries, object code, machine code, images, containers, virtual machines, or via any other suitable method. Processor circuitry 206 can execute tasks utilizing a runtime engine, interpreter, assembler, compiler, and/or central processing unit, or otherwise perform the instructions in the tasks. Processor circuitry 206 can further control or toggle an unused/under-utilized state for subscriber device 200. Such unused/under-utilized states are described in further detail above with reference to FIG. 1. Processor circuitry 206 can return subscriber device 200 to an active state upon reception of an appropriate signal (turning the power on, pressing of a standby button, etc.). Processor circuitry 206 can organize and return output of the execution of tasks for returning to service provider system 104.

Storage medium 208 stores configuration information about subscriber device 200 and other related information, Storage medium 208 can store configuration information as text files within a volatile memory, such as random access memory (RAM), and/or non-volatile memory, such as read-only memory (ROM). The RAM can be implemented in dynamic random-access memory (DRAM), a static random-access memory (SRAM), and/or a non-volatile random-access memory (NVRAM) configuration to provide some examples. Storage medium 208 can be organized into a database and can leverage any commercially available database management system such as Microsoft Access, Microsoft SQL server, an Oracle database, an IBM database, an SAP database, etc. Storage medium 208 can be any other suitable storage mechanism. Storage medium 208 can store unique identifiers for subscriber devices 102.1 through 102.$n$ to identify them within service provider system 104.

Exemplary Method to Execute Tasks on Subscriber Devices

Figure 3:
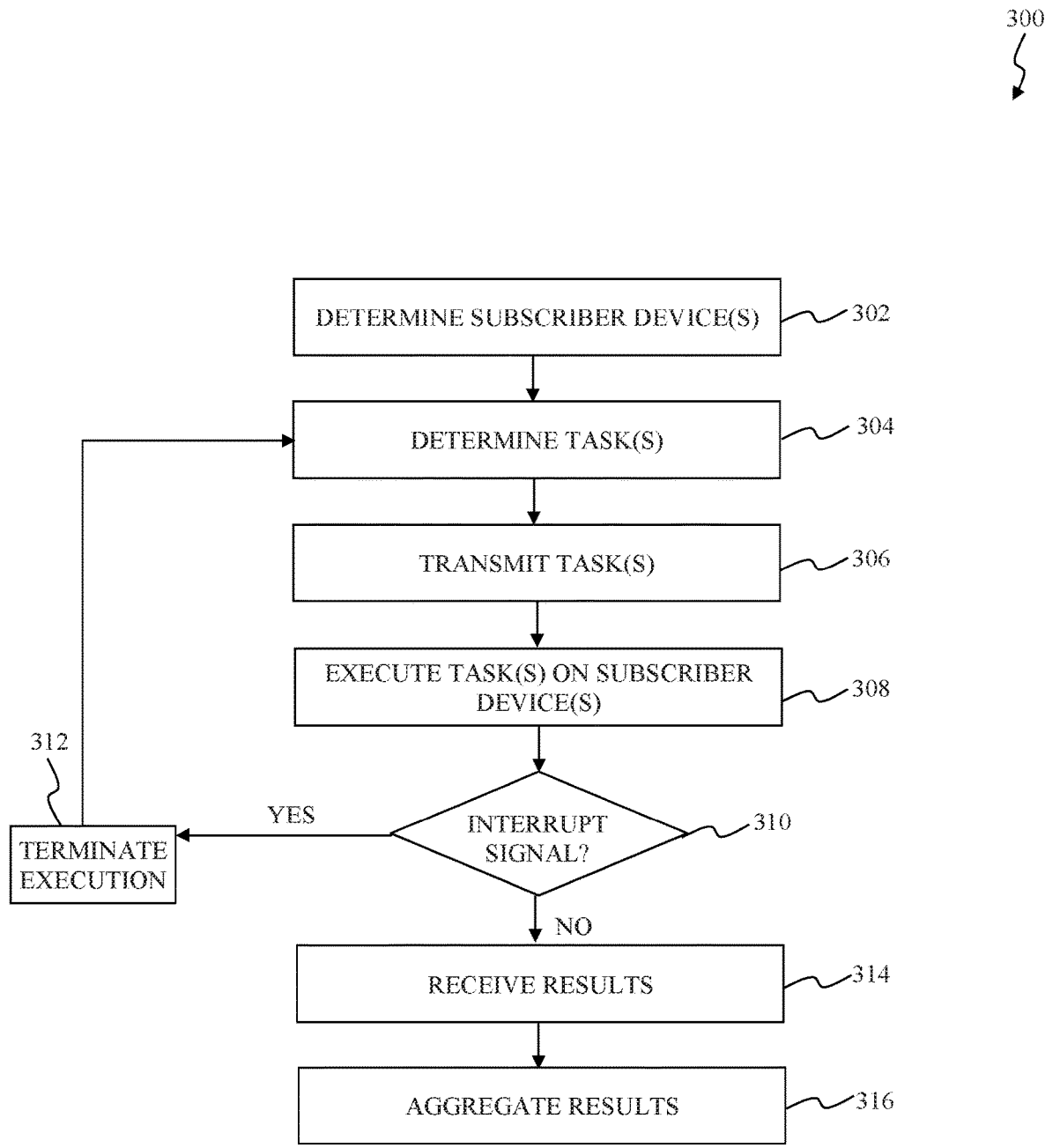
FIG. 3 is a flowchart of exemplary operational steps to transmit tasks to subscriber devices for execution, according to an embodiment of the present disclosure.

FIG. 3 is a flowchart of exemplary operational steps to transmit tasks to subscriber devices for execution, according to an embodiment of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 300 for transmitting tasks to subscriber devices, such as subscriber device 200 as described above in FIG. 1, for execution.

At operation 302, operational control flow 300 determines unused and/or under-utilized target subscriber devices from among subscriber devices 102.1 through 102.$n$ to commandeer for task execution. In an embodiment, operational control flow 300 determines one target subscriber device from among subscriber devices 102.1 through 102.$n$. In another embodiment, operational control flow 300 determines more than one target subscriber device from among subscriber devices 102.1 through 102.$n$. In an embodiment, operational control flow 300 can determine the target subscriber device(s) based on a geographic location as stored and maintained in an index of subscriber devices. In another embodiment, operational control flow 300 can winnow the list of subscriber devices based on a user inputs, situational constraints, or other suitable factors. Once operational control flow 300 determines the target subscriber device, operational control flow 300 can continue to monitor the determined target subscriber device(s) to ensure that the devices remain unused or under-utilized as these statuses can change dynamically as described above with reference to FIG. 1.

At operation 304, operational control flow 300 determines a task or tasks to transmit to the target subscriber device(s) for execution. In an embodiment, operational control flow 300 determines a list of tasks to be executed in an appropriate order. In an embodiment, only one task is selected. In another embodiment, more than one task is selected. As described above with reference to FIG. 1, tasks can perform a wide-array of functions including identifying, locating, and/or resolving various problems, gathering data/analytics, and/or performing system maintenance within point-to-multipoint communication system 100. In an embodiment, operational control flow 300 determines the tasks to execute based on details about the target subscriber device(s), previously completed tasks, testing scenarios, the problem being diagnosed, or other appropriate factors.

At operation 306, operational control flow 300 transmits the tasks determined in operation 304 to the target subscriber device(s) determined in operation 302. Operational control flow 300 can use HTTP or other Internet or transfer protocol to send the traffic to the target subscriber device(s). In an embodiment, operational control flow 300 can use any suitable method to facilitate the flow of data across the Internet, a local network, or other appropriate communication network. In an embodiment, operational control flow 300 can transmit data related to the task(s) in SSL, TLS, or other suitable cryptographic protocol enabling secure communications. In an embodiment, operational control flow 300 can bundle tasks or instructions using containers, virtual machines, zip files, or other suitable manner of compressing/bundling the instructions in the tasks.

At operation 308, operational control flow 300 executes the instructions in the tasks on the target subscriber device(s). In an embodiment, operational control flow 300 can unpack, unbundle, or otherwise prepare for execution the task. Operation control flow 300 can execute a process, function, program, or CPU instruction as needed to complete the instructions contained in the tasks. The time that it takes operational control flow 300 to execute the tasks can vary based on the nature of the tasks performed.

At operation 310, operational control flow 300 checks whether an interrupt signal was received by the target subscriber device(s). In an embodiment, an interrupt signal can occur when a subscriber turns on, powers on, or otherwise enables the target subscriber device(s). In an alternate embodiment, the target subscriber device(s) can receive an interrupt signal upon a state change, for instance, upon a notification to exit a standby mode. In another embodiment, an interrupt signal can be received a threshold CPU utilization is exceeded on the target subscriber device(s) thereby bringing the device out of an under-utilized state. If an interrupt signal is received in operation 310, then operational control flow 300 proceeds to operation 312. If no interrupt signal is received in operation 310 prior to the task execution completing, then operational control flow 300 proceeds to operation 314.

At operation 312, operational control flow 300 halts task execution to devote system resources to service provision. Task execution ceases and operational control flow 300 returns to operation 302 so that an additional target subscriber device can be selected. In an embodiment, operational control flow 300 can execute tasks on multiple subscriber devices, so in this embodiment, determination of additional subscriber devices may not be necessary. Operational control flow 300 can formulate a suitable error message, count the task as a null occurrence for the purposes of aggregations or calculations, or determine another suitable course of action.

At operation 314, operational control flow 300 receives results from the execution of the tasks completed in operation 308. Results can vary based on the nature of the task(s). In an embodiment, results can be the standard output of the tasks executions. In an embodiment, operational control flow 300 can store appropriate results in a local text file, local memory, database, etc. In an embodiment, operational control flow 300 can receive the data, output, and results via SSL, TLS, or other suitable cryptographic protocol enabling secure communications.

At operation 316, operational control flow 300 can perform additional analyses and/or further refine the received results. Such analyses can include aggregating data received from multiple tasks and/or from multiple subscriber devices. In an embodiment, operational control flow 300 can format the derived, aggregated data into a format appropriate for viewing. In another embodiment, operational control flow 300 can display results or output in a user interface.

CONCLUSION

Although the embodiments of the disclosure described herein refer specifically, and by way of example, to cable modem systems, including cable modem termination systems and cable modems, it will be readily apparent to those skilled in the relevant art(s) that the disclosure is equally applicable to satellite systems, optical communication systems, telephone wire systems, home network systems, and/or any combination thereof. It will be readily apparent to those skilled in the relevant art(s) that the disclosure is applicable to any point-to-multipoint system.

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment can not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes, and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software, or any combination thereof. Embodiments of the disclosure can also be implemented as instructions stored on a machine-readable medium, which can be read and executed by one or more processors. A machine-readable medium can include any mechanism for storing or transmitting information in a form readable by a machine e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software, routines, instructions can be described herein as performing certain actions. However, it should be appreciated that such descriptions are merely for convenience and that such actions in fact result from computing devices, processors, controllers, or other devices executing the firmware, software, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A service provider system within a point-to-multipoint communication system comprising:
   processor circuitry configured to:
      maintain an index of unused subscriber devices, wherein the service provider system provides a service to subscriber devices, and wherein an unused subscriber device in the index of unused subscriber devices is a subscriber device not receiving the service from the service provider system;
      select a target subscriber device from the index of unused subscriber devices;
      maintain a set of tasks that can be performed by the subscriber devices; and
      select a task from the set of tasks to send to the target subscriber device for execution; and
   physical layer circuitry configured to:
      send the task to the target subscriber device for execution; and
      receive a task result from the target subscriber device.

2. The service provider system of claim 1, wherein to select a target subscriber device the processor circuitry is configured to:
   associate the subscriber devices with zip codes;
   determine a geographic region;
   create a geographic index that is a subset of the index of unused subscriber devices, wherein only subscriber devices associated with zip codes located in the geographic region are in the geographic index; and
   select the target subscriber device from the geographic index.

3. The service provider system of claim 1, wherein the processor circuitry is further configured to:
   receive a set of instructions; and
   add the set of instructions as a task in the set of tasks for future execution.

4. The service provider system of claim 1, wherein the processor circuitry is further configured to:
   receive an availability indicator from a particular subscriber device, wherein the availability indicator signals to the service provider system that the particular subscriber device is unused; and
   add the particular subscriber device to the index of unused subscriber devices.

5. The service provider system of claim 1, wherein the processor circuitry is further configured to:
   receive an unavailability indicator from a particular subscriber device, wherein the unavailability indicator signals to the service provider system that the particular subscriber device is in use; and
   remove the particular subscriber device from the index of unused subscriber devices.

6. The service provider system of claim 1, wherein the task performs diagnostic checks on the target subscriber device.

7. The service provider system of claim 1, wherein the service comprises audio data and video data.

8. A subscriber device within a point-to-multipoint communication system comprising:
   physical layer circuitry configured to:
      receive a task from a service provider system that provides a service to the subscriber device, wherein the service provider system maintains an index of unused subscriber devices, wherein an unused subscriber device in the index of unused subscriber devices is a subscriber device not receiving the service, and wherein the subscriber device is not receiving the service from the service provider system; and
   processor circuitry configured to:
      execute the task; and
      return a task result to the service provider system via the physical layer circuitry.

9. The subscriber device of claim 8, wherein the physical layer circuitry is further configured to:
   send an availability indicator to the service provider system, wherein the availability indicator signals to the service provider system that the subscriber device is unused.

10. The subscriber device of claim 8, wherein the physical layer circuitry is further configured to:
    send an unavailability indicator to the service provider system, wherein the unavailability indicator signals to the service provider system that the subscriber device is in use.

11. The subscriber device of claim 8, wherein the processor circuitry is further configured to:
    receive an interrupt signal;
    halt execution of the task upon reception of the interrupt signal; and
    return an interrupt error to the service provider system indicating incomplete execution of the task.

12. The subscriber device of claim 8, wherein the service comprises audio data and video data.

13. The subscriber device of claim 8, wherein the physical layer circuitry is compliant with a communication standard or protocol, wherein the communication standard or protocol is a wireline communication standard or protocol.

14. A method, comprising:
    selecting, by a service provider system, a target subscriber device within a point-to-multipoint communication system from an index of unused subscriber devices, wherein the service provider system provides a service to subscriber devices, wherein an unused subscriber device in the index of unused subscriber devices is a subscriber device not receiving the service from the service provider system;
    determining, by the service provider system, a task to send to the target subscriber device;
    sending, by the service provider system, the task to the target subscriber device for execution; and
    receiving, by the service provider system, a task result from the target subscriber device.

15. The method of claim 14, the determining further comprising:
    associating, by the service provider system, the subscriber devices with zip codes;
    determining, by the service provider system, a geographic region;
    creating, by the service provider system, a geographic index that is a subset of the index of unused subscriber devices, wherein only subscriber devices associated with zip codes located in the geographic region are in the geographic index; and selecting, by the service provider system, the target subscriber device from the geographic index.

16. The method of claim 14, further comprising:
receiving, by the service provider system, an interrupt signal;
halting, by the service provider system, execution of the task upon reception of the interrupt signal;
determining, by the service provider system, a second target subscriber device from the index of unused subscriber devices; and
sending, by the service provider system, the task to the second target subscriber device for execution.

17. The method of claim 14, further comprising:
receiving, by the service provider system, an availability indicator from a particular subscriber device in the subscriber devices, wherein the availability indicator signals to the service provider system that the particular subscriber device is unused; and
adding, by the service provider system, the particular subscriber device to the index of unused subscriber devices.

18. The method of claim 14, further comprising:
receiving, by the service provider system, an unavailability indicator from a particular subscriber device in the subscriber devices, wherein the unavailability indicator signals to the service provider system that the particular subscriber device is in use; and
removing, by the service provider system, the particular subscriber device from the index of unused subscriber devices.

19. The service provider system of claim 1, wherein the task executes a network viability check.

20. The method of claim 14, wherein the task executes a network viability check.

* * * * *